(12) United States Patent
Meng et al.

(10) Patent No.: US 7,660,386 B2
(45) Date of Patent: Feb. 9, 2010

(54) VEHICLE-CARRIED RADIATION INSPECTION SYSTEM AND LIFTING DEVICE USED THEREIN

(75) Inventors: Hui Meng, Beijing (CN); Quanwei Song, Beijing (CN); Nan Jiang, Beijing (CN); Shangmin Sun, Beijing (CN); Chengxin Cao, Beijing (CN); Jinning Liang, Beijing (CN); Bin Hu, Beijing (CN); Yaohong Liu, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 112 days.

(21) Appl. No.: 11/959,699

(22) Filed: Dec. 19, 2007

(65) Prior Publication Data

US 2008/0165932 A1    Jul. 10, 2008

(51) Int. Cl.
*G01N 23/083* (2006.01)
*H05G 1/02* (2006.01)

(52) U.S. Cl. ................... 378/57; 378/189; 378/197; 378/198

(58) Field of Classification Search ............ 378/57, 378/198, 189, 197
See application file for complete search history.

(56) References Cited

U.S. PATENT DOCUMENTS

| | | | | |
|---|---|---|---|---|
| 5,638,420 A * | 6/1997 | Armistead | ............ | 378/57 |
| 5,692,028 A * | 11/1997 | Geus et al. | ............ | 378/57 |
| 6,663,569 B1 * | 12/2003 | Wilkins et al. | ............ | 600/459 |
| 6,763,635 B1 * | 7/2004 | Lowman | ............ | 52/114 |
| 6,785,357 B2 * | 8/2004 | Bernardi et al. | ............ | 378/57 |
| 6,843,599 B2 * | 1/2005 | Le et al. | ............ | 378/198 |
| 6,920,197 B2 * | 7/2005 | Kang et al. | ............ | 378/57 |
| 6,928,141 B2 * | 8/2005 | Carver et al. | ............ | 378/57 |
| 7,267,239 B2 * | 9/2007 | Takehara et al. | ............ | 212/270 |
| 7,322,745 B2 * | 1/2008 | Agrawal et al. | ............ | 378/198 |
| 7,352,843 B2 * | 4/2008 | Hu et al. | ............ | 378/57 |
| 7,369,643 B2 * | 5/2008 | Kotowski et al. | ............ | 378/57 |
| 7,486,768 B2 * | 2/2009 | Allman et al. | ............ | 378/57 |
| 7,497,618 B2 * | 3/2009 | Chen et al. | ............ | 378/198 |
| 7,517,149 B2 * | 4/2009 | Agrawal et al. | ............ | 378/198 |

FOREIGN PATENT DOCUMENTS

| | | |
|---|---|---|
| CN | 1401995 | 3/2003 |
| CN | 2572400 Y | 9/2003 |
| WO | WO 2005/057196 A1 * | 6/2005 |

* cited by examiner

*Primary Examiner*—Allen C. Ho
(74) *Attorney, Agent, or Firm*—Marshall, Gerstein & Borun LLP

(57) ABSTRACT

A vehicle-carried radiation inspection system has a simple structure with advantages of convenient operation, little scanning blind area and reliable safety performance. The system includes a loading vehicle, a lifting device mounted to the loading vehicle and a radiation scanning inspection device fixedly mounted to the lifting device so as to ascend/descend together with the lifting device. The lifting device is configured to enable the lifting device and the radiation scanning inspection device as a whole to be apart from the ground by a predetermined safety distance when the loading vehicle is moving, and to enable the minimum distance therebetween during inspection to be less than the predetermined safety distance. The radiation scanning inspection device may be switched between higher and lower positions as required with the ascending/descending of its combination with the lifting device.

6 Claims, 3 Drawing Sheets

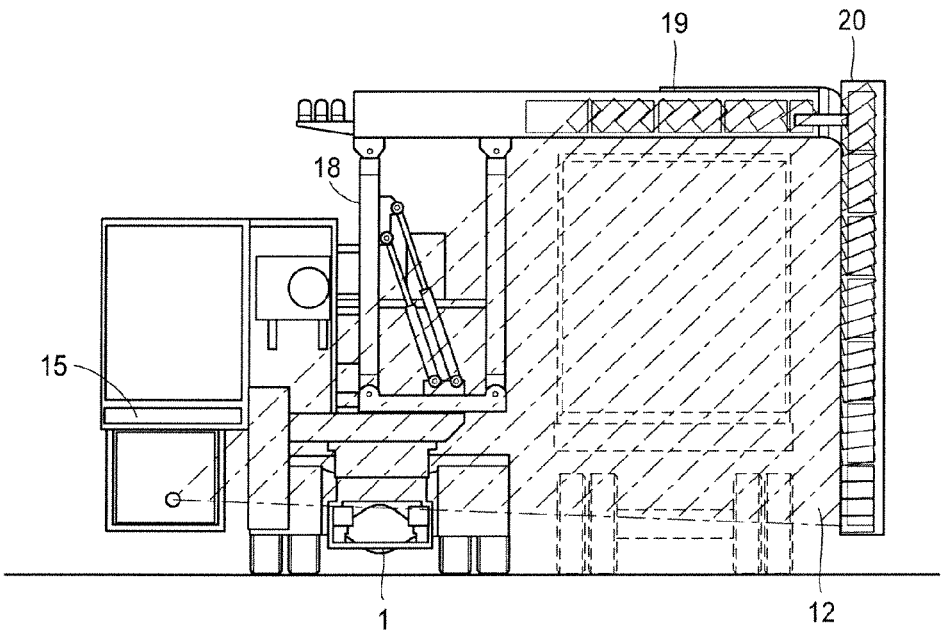
FIG. 5 *(Prior Art)*
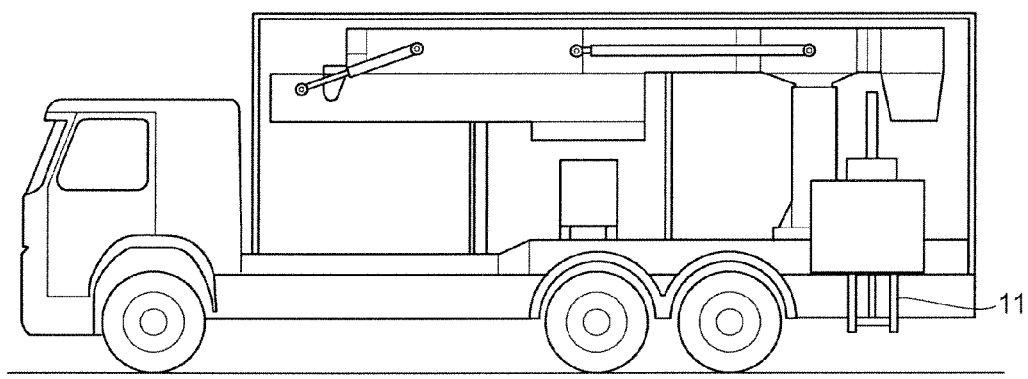
FIG. 6 *(Prior Art)*

VEHICLE-CARRIED RADIATION INSPECTION SYSTEM AND LIFTING DEVICE USED THEREIN

CROSS-REFERENCE TO RELATED APPLICATIONS

This application claims the benefit of Chinese patent application No. 200610169798.8, filed Dec. 28, 2006.

FIELD OF THE INVENTION

The present invention relates to a security inspection system, and more particularly to a vehicle-carried radiation inspection system with little scanning blind area.

BACKGROUND OF THE INVENTION

Both large-scale cargo container inspection system and security inspection system utilize radiation imaging to obtain radiographic image of objects by scanning the internal thereof under non-contacting condition with high-energy X-rays having penetration ability. In order to meet the requirements of laws on road traffic safety, safety off-ground space must be kept and special off-ground angle included between a vehicle-carried inspection system and a road when the vehicle is moving on the road, which generally results in a relatively high position of the radiation sources in the scanning device of the inspection system. Consequently, relatively large area in the lower part of the object being inspected can not be detected when performing inspection by radiation scanning. In other words, most existing vehicle-carried radiation inspection systems have a drawback of large scanning blind area.

CN2572400Y discloses a vehicle-carried mobile cargo container inspection system. As shown in FIG. 5, when inspecting a cargo container and its carrying vehicle by the inspection system, rotatable platform 15 mounted on scanning vehicle 1 first horizontally turns 90 degrees. Then, bracket 18, horizontal suspension arm 19 and vertical suspension arm 20 form a portal-shaped frame which straddles the cargo container to be inspected. Finally, radiation sources which will generate X-rays face the orthogonal arms 19 and 20. When performing inspection, radiation sources generate X-rays which penetrate through the cargo container being inspected and its carrying vehicle, and the detectors mounted in arms 19 and 20 then receive the penetrating X-rays. When moving the inspection system, rotatable platform 15 mounted on scanning vehicle 1 turns back 90 degrees, and arms 19 and 20 then overlap each other so as to horizontally lie on scanning vehicle 1. In this inspection system, cabin can be located apart from the ground by a small distance so that fan-shaped X-ray beam 12 generated by radiation sources mounted in cabin may penetrate through the cargo container being inspected and its carrying vehicle at a lower level, thereby enlarging the detection scope, e.g., the chassis of the container carrying vehicle may be detected. However, just due to the small distance from the ground to cabin 6, risk would occur when scanning vehicle 1 is moving.

CN1401995A also discloses a vehicle-carried cargo container inspection system. As shown in FIG. 6, radiation sources device 16 can slide up and down along vertical guide 11 so as to meet the requirements of the detection scope for the object to be inspected. Radiation sources device 16 is lifted to a higher position and locked there to avoid damage during transportation. Although this system may enlarge detection scope, risk would still occur during its transportation because guide 11 per se is located low.

SUMMARY OF THE INVENTION

In view of the above-mentioned drawbacks of the existing art, an object of the invention is to provide a vehicle-carried radiation inspection system having a simple structure with advantages of convenient operation and little scanning blind area.

In order to achieve the object, a vehicle-carried radiation inspection system according to the present invention is provided which comprises a loading vehicle, a lifting device mounted to the loading vehicle and a radiation scanning inspection device fixedly mounted to the lifting device so as to ascend/descend together with the lifting device. The lifting device is configured to enable the lifting device and the radiation scanning inspection device as a whole to be apart from the ground by a predetermined safety distance when the loading vehicle is moving, and to enable the minimum distance therebetween during inspection to be less than the predetermined safety distance.

Correspondingly, a lifting device according to the present invention is also provided which is to be used in a vehicle-carried radiation inspection system for ascending/descending the radiation scanning inspection device. The system comprises a loading vehicle, a radiation scanning inspection means device and a rotatable platform horizontally rotatably mounted relative to the loading vehicle. The lifting device comprises a connecting plate for fixedly connecting the rotatable platform and extending out of the backend of the loading vehicle and a lifting support. The lifting support comprises at least one vertical guiding cylinder fixedly mounted to the connecting plate, at least one sliding column each slidably engaged within a corresponding one of the at least one guiding cylinder and a carrier fixed to the lower end(s) of the at least one sliding column. The carrier is for carrying the radiation scanning inspection device.

The inspection system according to the present invention may further comprise a rotatable platform horizontally rotatably mounted relative to the loading vehicle, and a connecting plate fixedly connected to the rotatable platform and extending out of the backend of the loading vehicle. The lifting device is fixed to the connecting plate.

The lifting device is fixed below the connecting plate.

The lifting device includes a lifting support which comprises at least one vertical guiding cylinder fixedly mounted to the connecting plate, at least one sliding column each slidably engaged within a corresponding one of the at least one guiding cylinder and a carrier fixed to the lower end(s) of the at least one sliding column. The radiation scanning inspection device is fixedly mounted on the carrier.

The number of the at least one guiding cylinder as well as the at least one sliding column is preferably four.

The lifting support further comprises a security locking pin disposed on the at least one guiding cylinder for locking the at least one sliding column with the at least one guiding cylinder.

The lifting device further includes a driving device having a hydrocylinder with its body fixed to the connecting plate and its piston rod fixed to the carrier respectively.

The predetermined safety distance as well as the minimum distance depends on the distance from the carrier to the ground.

The radiation scanning inspection device includes an accelerator having radiation sources for generating X-rays mounted therein.

Another vehicle-carried radiation inspection system according to the present invention is also provided which comprises a loading vehicle, a rotatable platform horizontally rotatably mounted relative to the loading vehicle, a connecting plate fixedly connected to the rotatable platform and extending out of the backend of the loading vehicle, a support fixedly connected to the connecting plate and a radiation scanning inspection device fixedly mounted to the support. The rotatable platform is configured to be able to ascend/descend relative to the loading vehicle so as to cause the support fixedly connected therewith to ascend/descend and thereby result in ascending/descending of the radiation scanning inspection device fixed to the support.

The vehicle-carried radiation inspection system according to the present invention has following advantages and positive results: due to the arrangement of the lifting device on the loading vehicle, the radiation sources within the accelerator mounted on the lifting device may ascend/descend with the ascending/descending of the accelerator. Thus, when the vehicle-carried radiation inspection system according to the present invention is moving on the road, the accelerator can be lifted to a higher position so as to achieve a larger off-ground space and a greater off-ground angle; when it is in scanning inspection condition, the accelerator can be lowered to enable lower position of the radiation sources, which as a result decreases the scanning blind area. In addition, the invention is achieved by incorporation of the lifting device into the existing structure, which results in a relatively simple structure with advantages of very convenient operation (only need to actuate or stop the driving device for operating the lifting device) and reliable safety performance.

BRIEF DESCRIPTION OF THE DRAWINGS

FIG. 5 is a schematic elevation view of an existing vehicle-carried radiation inspection system; and FIG. 6 is a schematic elevation view of another existing vehicle-carried radiation inspection system.

DETAILED DESCRIPTION OF THE PREFERRED EMBODIMENTS

Figure 1:
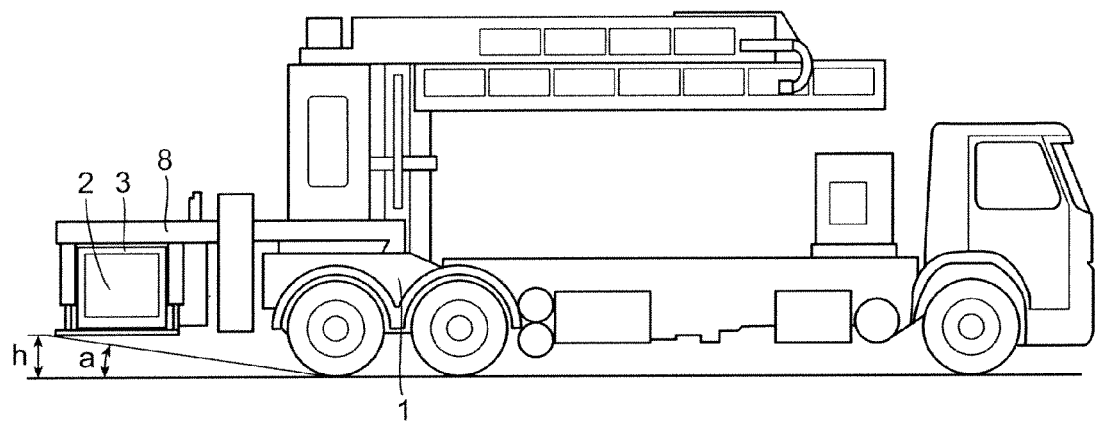
FIG. 1 is a schematic elevation view of a vehicle-carried radiation inspection system according to the invention, shown in a transporting position.

It should be noted that the following embodiments are used for the purpose of illustration only not as a definition of the limits of the invention. In the drawings, similar reference characters denote similar elements throughout the several views.

Figure 2:
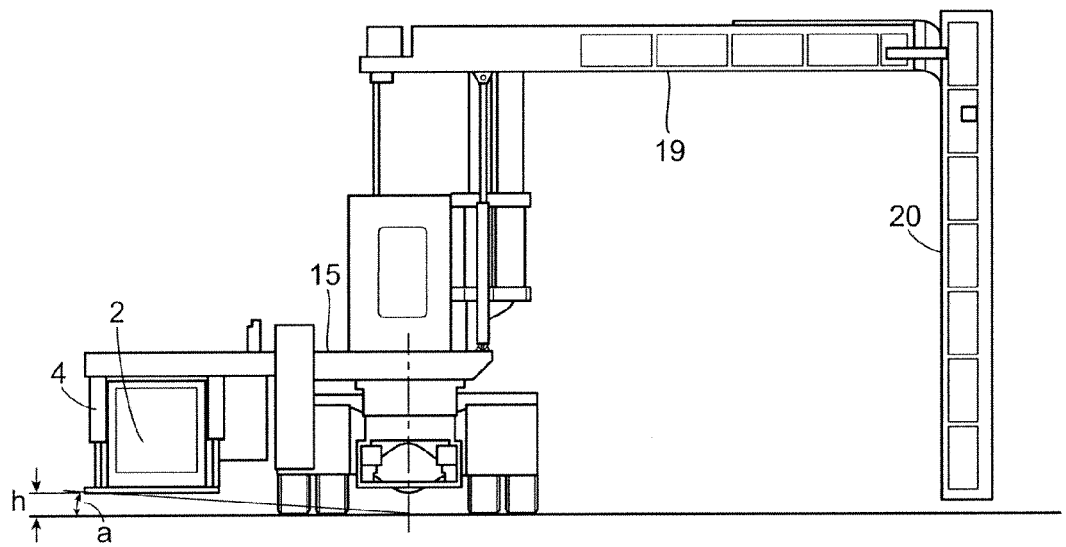
FIG. 2 is a schematic elevation view of the vehicle-carried radiation inspection system according to the invention, shown in a scanning position.

As shown in FIGS. 1 and 2, a vehicle-carried radiation inspection system according to the invention comprises loading vehicle 1 on the backend of which is mounted a lifting device including lifting support 4 and driving device therefor. A radiation scanning inspection device mounted to lifting support 4 includes such as an accelerator for scanning inspection having radiation sources 2 for generating X-rays mounted therein. The vehicle-carried radiation inspection system according to the invention has a substantially similar construction to the existing vehicle-carried radiation inspection system such as disclosed in CN2572400Y and CN1401995A (both of which are hereby incorporated by reference in their entirety herein), except for the lifting device used in the invention. Therefore, the description of those parts or structures of the system which are not related to the lifting device in the invention is omitted for the sake of conciseness.

Figure 3:
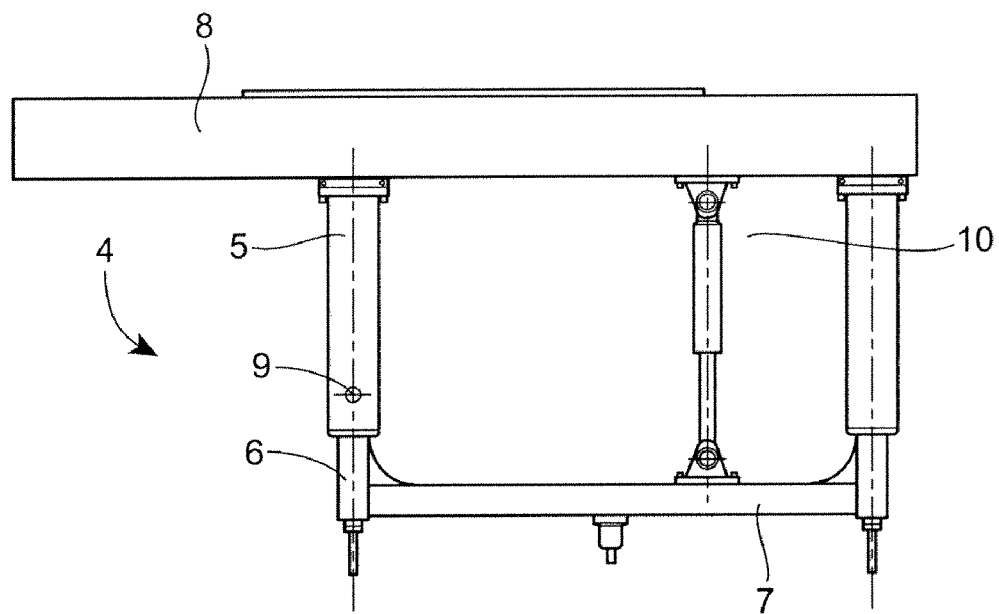
FIG. 3 is a schematic elevation view of a lifting device used in the invention.
Figure 4:
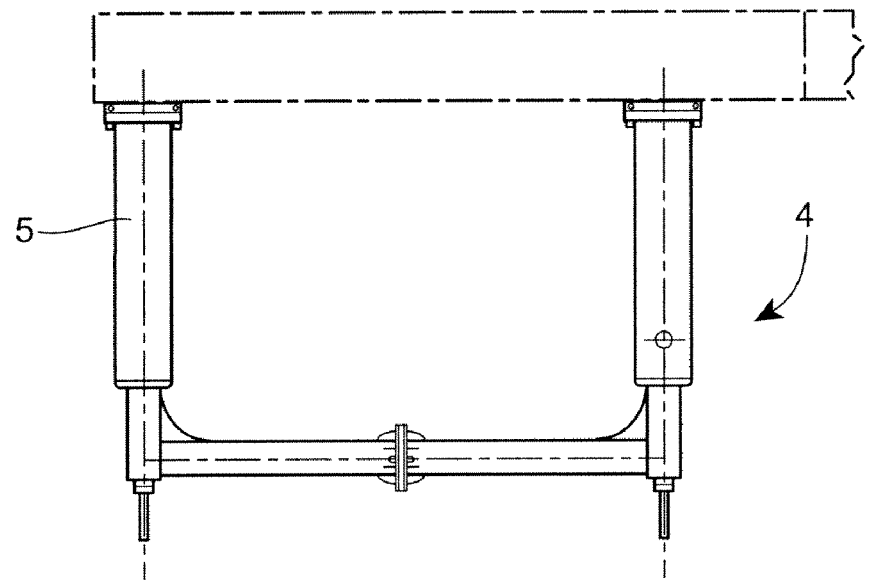
FIG. 4 is a side elevation view of the lifting device shown in FIG. 3.

As shown in FIGS. 3 and 4, loading vehicle 1 is provided at the backend with connecting plate 8 which is fixed to and rotatable together with rotatable platform 15. Preferably, connecting plate 8 and rotatable platform 15 are in a same horizontal plane, or alternatively, connecting plate 8 is a horizontal portion of rotatable platform 15 extending backwardly out of the loading vehicle. Lifting support 4 according to the invention consists of preferably four guiding cylinders 5 fixedly mounted to connecting plate 8, four sliding columns 6 each slidably engaged within corresponding guiding cylinder 5 and carrier 7 fixed to the lower ends of four sliding columns 6 for carrying accelerator 3 fixedly mounted thereon. However, lifting support 4 is not limited to the above-described construction. It is apparent to those skilled in the art from the disclosure that any other structures which can perform the desired lifting are applicable. That is to say, lifting support 4 can be configured to enable lifting support 4 and accelerator 3 as a whole to be apart from the ground by a predetermined safety distance (safety off-ground space) when loading vehicle 1 is moving, and to enable the minimum distance therebetween during inspection to be less than the predetermined safety distance. Guiding cylinder 5 is provided with security locking pin 9 for locking corresponding sliding column 6 with guiding cylinder 5. Security locking pin 9 functions to ensure accelerator 3 reliably kept in high position so as to guarantee safety when the vehicle-carried radiation inspection system according to the invention is moving on the road.

The driving device according to the invention is hydrocylinder 10 having its body fixed to connecting plate 8 and its piston rod fixed to accelerator carrier 7 respectively. The driving device may also be of other suitable structure forms, e.g., air cylinder, screw and nut mechanism or the like. The lifting device according to the invention may also be mounted to other suitable structures on the loading vehicle or otherwise positioned thereon. In addition, the lifting device according to the invention may be otherwise formed, e.g., rotatable platform 15 may be configured to be able to ascend/descend as a whole (as a matter of course, there may need a high-power hydrocylinder for its lifting) so as to cause the support integrated therewith to ascend/descend and thereby result in ascending/descending of the radiation scanning inspection device fixed to the support, to achieve the same end result as the combination of the aforementioned lifting support 4 and the driving device therefor.

The basic operating principle of the inspection system according to the invention is now described, which is substantially similar to the existing ones. As shown in FIG. 2, when inspecting a cargo container to be inspected and its carrying vehicle by the inspection system, rotatable platform 15 mounted on loading vehicle 1 first horizontally turns 90 degrees. Then, horizontal suspension arm 19 and vertical suspension arm 20 form a portal-shaped frame which straddles the cargo container to be inspected (not shown). Finally, radiation sources 2 which will generate X-rays face the orthogonal arms 19 and 20. When performing inspection, radiation sources 2 generate X-rays which penetrate through the cargo container being inspected and its carrying vehicle, and the detectors mounted in arms 19 and 20 then receive the penetrating X-rays. When transporting or moving the inspection system, rotatable platform 15 mounted on loading vehicle 1 turns back 90 degrees, and arms 19 and 20 then overlap each other so as to horizontally lie on loading vehicle 1, as shown in FIG. 1.

The operating principle of the lifting device according to the invention is now explained. As shown in FIG. 1, when the vehicle-carried radiation inspection system according to the invention is moving on the road, the piston rod of hydrocylinder 10 is contracted into the body of hydrocylinder 10 and guiding cylinder 5 is locked with corresponding sliding column 6 by security locking pin 9 thereby to ensure accelerator 3 reliably kept in high position so as to guarantee safety. Therefore, distance h between the bottom end surface of carrier 7 of lifting support 4 and the ground, i.e., the off-ground space, is relatively large; and angle α included between the plane formed by the bottom of the rear vehicle tires with the left side of the bottom end surface of carrier 7 and the ground, i.e., the off-ground angle, is relatively great. In other words, both the off-ground space h and the off-ground angle α can meet the requirements of laws on road traffic safety.

As shown in FIG. 2, when the vehicle-carried radiation inspection system according to the invention is under scanning condition, the off-ground space h and the off-ground angle α need no more to be concerned but the scanning area as large as possible for inspecting the whole internal of the object to be inspected. At this time, security locking pin 9 is unlocked so that the piston rod of hydrocylinder 10 extends out of the hydrocylinder body to downwardly move accelerator 3 and thereby lower the radiation sources, which effectively decreases the scanning blind area by enabling lower scanning areas.

Due to the arrangement of the lifting device in the vehicle-carried radiation inspection system according to the invention, the radiation sources within the accelerator may be switched between higher and lower positions as required with the ascending/descending of the lifting device and therefore the accelerator mounted therein. Therefore, the invention is adapted not only to be able to meet the requirements of laws on road traffic safety, but also to enable the decrease of the scanning blind area in great amount while having advantages of convenient operation and reliable safety performance.

As shown herein to describe the present invention, it should be understood by those skilled in the art that the following directional terms "above, downward, forward, rearward, vertical and horizontal" as well as any other similar directional terms refer to those directions of a normally moving or stopped loading vehicle 1.

The invention claimed is:

1. A vehicle-carried radiation inspection system comprising:
    a loading vehicle;
    a lifting device mounted to the loading vehicle;
    a radiation scanning inspection device fixedly mounted to the lifting device so as to ascend/descend together with the lifting device,
    a rotatable platform horizontally rotatably mounted relative to the loading vehicle; and
    a connecting plate fixedly connected to the rotatable platform and extending out of a backend of the loading vehicle,
    wherein the lifting device is configured to enable the lifting device and the radiation scanning inspection device as a whole to be apart from the ground by a predetermined safety distance when the loading vehicle is moving, and to enable the minimum distance therebetween during inspection to be less than the predetermined safety distance,
    wherein the lifting device is fixed to the connecting plate,
    wherein the lifting device is disposed below the connecting plate,
    wherein the lifting device includes a lifting support which comprises at least one vertical guiding cylinder fixedly mounted to the connecting plate, at least one sliding column slidably engaged within the least one vertical guiding cylinder, and a carrier fixed to a lower end of the at least one sliding column, and
    wherein the radiation scanning inspection device is fixedly mounted on the carrier.

2. The system of claim 1, comprising at least four guiding cylinders as well as at least four sliding columns.

3. The system of claim 1, wherein the lifting support further comprises a security locking pin disposed on the at least one guiding cylinder for locking the at least one sliding column with the at least one guiding cylinder.

4. The system of claim 1, wherein the lifting device further includes a driving device having a hydrocylinder with a body fixed to the connecting plate and a piston rod fixed to the carrier.

5. The system of claim 1, wherein the predetermined safety distance as well as the minimum distance depends on the distance from the carrier to the ground.

6. The system of claim 1, wherein the radiation scanning inspection device includes an accelerator having radiation sources for generating X-rays mounted therein.

* * * * *